2,980,698
DICYANOKETENE CYCLIC ACETALS AND PROCESS FOR PREPARATION

Richard Edwin Heckert, Richmond, Va., and William Joseph Middleton, Claymont, Del., assignors to E. I. du Pont de Nemours and Company, Wilmington, Del., a corporation of Delaware No Drawing. Filed Apr. 25, 1958, Ser. No. 730,798

7 Claims. (Cl. 260—340.7)

This invention relates to cyclic acetals and their preparation, and more particularly, to a new class of substituted ketene cyclic acetals and a process of preparing such acetals.

This application is a continuation-in-part of our copending and now abandoned United States application Serial No. 416,720, filed March 16, 1954.

Ketene acetals and certain substituted ketene acetals are known in the art. Of the substituted ketene acetals, those in which the substituents are hydrocarbon are best known. A monocyanoketene acetal has been described (McElvain, S. M., and Schroeder, J. P., J. Am. Chem. Soc. 71, 47 (1949) but the preparation of higher cyano-substituted derivatives of ketene cyclic acetals has not been previously accomplished.

An object of the present invention is to provide a new class of substituted ketene cyclic acetals. A further object is to provide a process of preparing such compounds. Other objects will be apparent from the description of the invention given hereinafter.

The above objects are accomplished according to the present invention by reacting tetracyanoethylene with dihydric alcohols to form dicyanoketene cyclic acetals. The 2-dicyanomethylene-1,3-dioxacycloaliphatic compounds which are obtained are colorless, crystalline solids melting at temperatures in the range of 50° C.–150° C. and above. Their preparation from tetracyanoethylene and dihydric alcohols may be illustrated as follows:

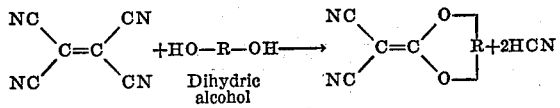

where R is a divalent aliphatic hydrocarbon radical with its valences stemming from adjacent carbon atoms or from carbon atoms separated by a single carbon atom.

The preparation of the cyanoketene cyclic acetals can be conveniently carried out according to this invention by dissolving tetracyanoethylene in an excess of the glycol which is selected to yield the desired acetal. A catalyst may be added if desired, and the solution is heated to boiling until the dark color characteristic of the solution of tetracyanoethylene in the glycol is dispelled, indicating that all the tetracyanoethylene has been used in the reaction. The mixture is then cooled and the dicyanoketene cyclic acetal crystallizes out. The acetal is purified by recrystallization.

Tetracyanoethylene, for use in the process of the present invention, can be prepared by heating sulfur monochloride with malononitrile, suitably in the presence of an inert liquid diluent.

In the following examples illustrative of the invention, parts are by weight except where otherwise specified.

Example I

A mixture of 64 parts of tetracyanoethylene and 134 parts of ethylene glycol is heated to boiling for several minutes until solution is complete. The resulting black reaction mixture is cooled to 0° C. and 250 parts of cold water is added. The precipitate which forms is separated by filtration and recrystallized 3 times from ethanol, using decolorizing carbon. There is obtained 7.1 parts of white crystalline 2-dicyanomethylene-1,3-dioxolane melting at 112–114° C.

Example II

A mixture of 64 parts of tetracyanoethylene, 10 parts of urea, and 134 parts of ethylene glycol is heated over a steam bath until the dark color which forms at first, fades. The mixture is cooled and poured into 5000 parts of cold water. The precipitate is collected on a filter (64 parts, 94% yield) and recrystallized from alcohol-water using decolorizing carbon. There is obtained 46.2 parts of 2-dicyanomethylene-1,3-dioxolane, alternately named dicyanoketene ethylene acetal, in the form of white needles, M.P. 113° C.–114° C. This same product is obtained by reacting tetracyanoethylene with ethylene glycol in the presence of zinc chloride.

Analysis.—Calc'd. for $C_6H_4O_2N_2$: C, 52.94; H, 2.96; N, 20.59; M.W., 136.1. Found: C, 53.28, 53.25; H, 3.05, 3.20; N, 20.65, 20.65; M.W., 135, 137.

When this product is recrystallized from dioxane, very large colorless prisms of 2-dicyanomethylene-1,3-dioxolane containing dioxane of solvation are obtained.

Example III

A mixture of 64 parts of tetracyanoethylene, 10 parts of urea, and 263 parts of trimethylene glycol is heated until all the solid dissolves. The solution is cooled to 0° C., and a precipitate of long, white needles forms. This precipitate is collected on a filter and washed with water to yield 70 parts (93% yield) of crude product which is then recrystallized from ethyl alcohol. There is obtained 55 parts of 2-dicyanomethylene-1,3-dioxane, alternately named dicyanoketene trimethylene acetal, in the form of white needles, M.P. 119° C.–120° C. The infrared absorption spectrum shows a doublet band at 4.48 and 4.52 microns for C≡N and a band at 6.40 microns for —C=C—.

Analysis.—Calc'd. for $C_7H_6O_2N_2$: C, 56.01; H, 4.03; N, 18.67; M.W., 150. Found: C, 56.13, 55.99; H, 4.28, 4.35; N, 18.76, 18.76; M.W., 151, 145.

Example IV

A mixture of 64 parts of tetracyanoethylene, 10 parts of urea, and 260 parts of propylene glycol is heated until the solution becomes homogeneous and boils vigorously. The solution is cooled and poured into 3000 parts of cold water. The oil which precipitates soon solidifies, and the solid (70 parts, 93% yield) is collected on a filter and washed with water. This material is recrystallized from ethyl alcohol to obtain 2-dicyanomethylene-4-methyl-1,3-dioxolane

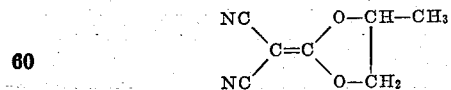

in the form of a white crystalline solid, M.P. 60° C.–61° C.

Analysis.—Calc'd. for $C_7H_6O_2N_2$: C, 56.01; H, 4.03; N, 18.67. Found: C, 55.97, 56.13; H, 4.08, 4.02; N, 18.72, 18.80.

Example V

A mixture of 284 parts of 3-cyclohexene-1,1-dimethylol, 256 parts of tetracyanoethylene, 20 parts of urea and 890 parts of tetrahydrofuran is heated at 60–80° C. for about 10 minutes until the solids dissolve. The solution is cooled to room temperature and 2000 parts of water is added. The precipitate which forms is collected by filtration, washed with water and recrystallized from ethanol. There is obtained 275 parts of 2-dicyanomethylene-1,3-dioxaspiro [5.5]undecene-7,

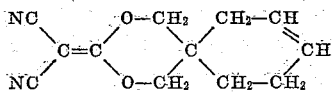

in the form of white needles melting at 160–161° C.

*Analysis.*—Calc'd. for $C_{12}H_{12}N_2O_2$: C, 66.64; H, 5.60; N, 12.96. Found: C, 66.78; H, 5.59; N, 13.07.

It will be understood the above examples are merely illustrative and that the present invention broadly comprises the new class of compounds, dicyanoketene cyclic acetals, and the method of preparing such acetals by reacting tetracyanoethylene with a glycol.

As will be apparent to those skilled in the art, any member of the class of dicyanoketene cyclic acetals can be prepared by selecting the corresponding glycol to react with the tetracyanoethylene. This is illustrated in the examples and is further illustrated as follows:

When 3,4-diethyl-3,4-hexanediol (tetraethylethyleneglycol) is employed, 2-dicyanomethylene-4,4,5,5-tetraethyl-1,3-dioxolane is obtained. When 4,5-octanediol is employed, 2-dicyanomethylene-4,5-di-n-propyl-1,3-dioxolane is obtained. When 2-methyl-2,4-pentanediol is employed, 2-dicyanomethylene-4,4,6-trimethyl-1,3-dioxane is obtained.

The present invention is not restricted to the acetals formed by reacting tetracyanoethylene with glycols, that is, dihydric alcohols. The reaction of this invention is likewise applicable to other polyhydric alcohols, such as cellulose and polyvinyl alcohol. When tetracyanoethylene reacts with polyvinyl alcohol, the polyvinyl ketal of beta, beta-dicyanoketene is obtained, in which part or all of the polyvinyl alcohol molecule is converted to structures as follows:

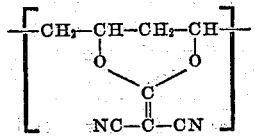

The term "glycol" is used herein to denote aliphatic glycols as distinguished from such aromatic compounds as hydroquinone. The present reaction is applicable to aliphatic glycols in general, including both saturated and unsaturated polyhydric alcoohls. On the other hand, it is not applicable to the dihydric phenols. Correspondingly, the dicyanoketene acetals of the present invention are the acetals of glycols, i.e., aliphatic saturated or unsaturated polyhydric alcohols.

As illustrated in Example I, the reaction of tetracyanoethylene with 1,2 and 1,3 glycols to produce the corresponding 2-dicyanomethylene-1,3-dioxolanes and 2-dicyanomethylene-1,3-dioxanes will take place by simply bringing the reactants into intimate contact. Heating accelerates the reaction but is not essential. The use of a catalyst likewise accelerates the reaction, and to obtain good yields of product within a reasonable length of time the use of a catalyst is preferred. Catalysts particularly suitable for the purpose include urea, tertiary amines and salts of the metals.

There is a great variety in the substances which satisfactorily function as catalysts. Not only are tertiary amines of all sorts suitable catalysts but the widest assortment of salts of metals are effective. No inoperative metal salt has been found. Suitable catalysts include such materials as urea, $FeCl_3$, $CrCl_3$, $Mg(OAc)_2$, $CoCl_2$, $MnCl_2$, $MgCl_2$, $CuCl_2$, $CaCl_2$, $AgNO_3$, $NiCl_2$, $Cu(OAc)_2$, $HgBr_2$, $Pb(OAc)_2$, $ZrOCl_2 \cdot 8H_2O$, $SnCl_2$, $UO_2SO_4 \cdot 3H_2O$, $Ce(NH_4)_2(NO_3)_6$, triethylamine, and pyridine.

The amount of catalyst employed, if any, may be varied over wide limits. The reaction may be carried out with trace amounts of catalyst (0.1 mole percent) but a concentration of catalyst of 1 to 50 mole percent based on the tetracyanoethylene is preferred in order to eliminate side reactions and shorten the time necessary for complete reaction.

The process of the present invention may be carried out at room temperature but to promote more rapid completion of the reaction, it is preferred to use elevated temperatures, particularly those in the range from 50° C. up to the boiling point of the glycol being used to prepare the acetal. As will be seen from the foregoing examples, this includes temperatures up to 200° C. and above. Pressure is not critical and atmospheric pressure normally will be employed as a matter of convenience.

It is preferred to carry out the process of the present invention in the presence of an excess of the glycol being used in the reaction, the excess glycol serving as a solvent and diluent. Other solvents and diluents which are inert to the reactants may be used if desired. Suitable solvents for this purpose are hydrocarbons, e.g., hexane, cyclohexene, benzene, and the like, and the ethers, e.g., dimethyl ether, diethyl ether, and the like. When an inert solvent is employed, only chemical equivalent amounts of the glycol and tetracyanoethylene need be employed.

The dicyanoketene cyclic acetals of this invention are characterized by greater thermal stability than the corresponding non-cyclic dialkyl acetals. The cyclic acetals are also specifically useful for reacting with tertiary amines to prepare 2,2 - dicyano - 1 - [(trisubstitutedammonium)-alkoxy]ethenolates as shown by W. J. Middleton in U.S. 2,721,206 and for reacting with hydrocarbon sulfides, thioamides and thioureas to prepare 2,2-dicyano-1-[(dihydrocarbonsulfonium)alkoxy]ethenolates, 2,2 - dicyano - 1-[(acylimidiumthio)alkoxy]ethenolates and 2,2 - dicyano-1-[(S-isothiouronium)alkoxy]ethenolates, respectively, as shown by V. A. Engelhardt and W. J. Middleton in U.S. 2,766,270.

The cyclic acetals of this invention are useful for the preparation of polymeric materials. All of these compounds possess vinyl unsaturation and can be converted by the action of vinyl-type polymerization catalysts to the corresponding vinyl polymers in which the predominant structure is of the type

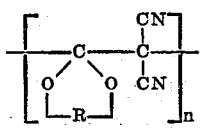

where R is as defined above. These polymers are thermoplastic, gum-like products which are useful as hot-melt adhesives for bookbinding. The high cyano content of these adhesives imparts resistance to mildew, mold, and rot so that these adhesives are particularly useful in binding books and papers to be exposed to high humidities, for example, in the tropics.

The 2-dicyanomethylene cyclic 1,3-acetals, such as the 2-dicyanomethylene-1,3-dioxolanes and the 2-dicyanomethylene-1,3-dioxanes, are especially useful because of their capacity for conversion to crosslinked polymeric form. These compounds possess not only the capacity for vinyl-type polymerization noted above but have the additional capacity for polymerization to polyethers through ring opening of the cyclic acetal ring. Thus, vinyl-type polymerization of these products yields a thermoplastic polymer of the type indicated above which is then compounded with known ring opening and polymerization catalysts suitable for polymerizing the cyclic acetal part of the structure. This composition is then molded under heat and pressure, the heat being sufficient to activate the ring opening and polymerization catalysts with the resultant formation of crosslinked structures of the type:

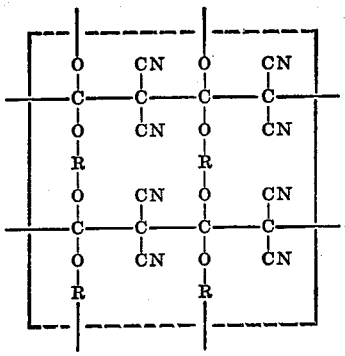

This same crosslinking effect is achieved when the two types of polymerization characteristic of the dicyanoketene cyclic acetals are carried out in reverse order, i.e., the dicyanoketene cyclic acetal is first polymerized through ring opening to yield a thermoplastic dicyanomethylene-substituted polyether. A vinyl-type polymerization catalyst is then incorporated and the composition is molded under heat and pressure to produce a crosslinked, infusible, insoluble molded object. Such moldings are particularly useful as insulators and component parts of electrical heating appliances such as for handles of electric irons and dials and knobs for electrically heated cooking appliances.

As many apparently widely different embodiments of this invention may be made without departing from the spirit and scope thereof, it is to be understood that the invention is not limited to the specific embodiments thereof except as defined in the appended claims.

The embodiments of the invention in which an exclusive property or privilege is claimed are defined as follows.

We claim:
1. 2-dicyanomethylene-1,3-dioxolane.
2. 2-dicyanomethylene-1,3-dioxane.
3. 2-dicyanomethylene-4-methyl-1,3-dioxolane.
4. 2-dicyanomethylene-1,3-dioxaspiro[5.5]undecene-7.
5. A compound selected from the class consisting of 2-dicyanomethylene-1,3-dioxolanes of the formula

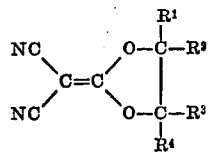

wherein the R's are selected from the class consisting of hydrogen and lower alkyl, and 2-dicyanomethylene-1,3-dioxanes of the formula

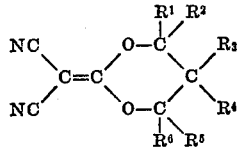

wherein the R's are selected from the class consisting of hydrogen, lower alkyl and $R^3$ and $R^4$ taken together represent with the carbon to which they are attached a cyclohexene ring having a double bond in the 3-position.

6. Process for preparing a compound selected from the class consisting of 2-dicyanomethylene-1,3-dioxolanes of the formula

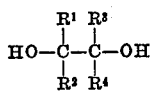

wherein the R's are selected from the class consisting of hydrogen and lower alkyl, and 2-dicyanomethylene-1,3-dioxanes of the formula

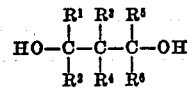

wherein the R's are selected from the class consisting of hydrogen, lower alkyl and $R^3$ and $R^4$ taken together represent with the carbon to which they are attached a cyclohexene ring having a double bond in the 3-position which comprises heating tetracyanoethylene with a glycol selected from the class consisting of compounds of the formula

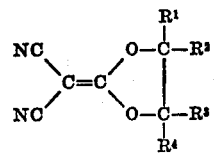

wherein the R's are selected from the class consisting of hydrogen and lower alkyl, and compounds of the formula

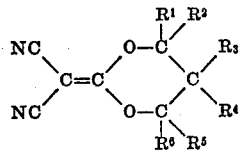

wherein the R's are selected from the class consisting of hydrogen, lower alkyl, and $R^3$ and $R^4$ taken together with the carbon to which they are attached represent a cyclohexene ring having a double bond in the 3-position.

7. Process for preparing a compound selected from the class consisting of 2-dicyanomethylene-1,3-dioxolanes of the formula

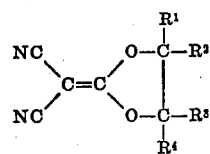

wherein the R's are selected from the class consisting of hydrogen and lower alkyl, and 2-dicyanomethylene-1,3-dioxanes of the formula

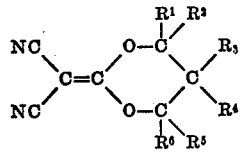

wherein the R's are selected from the class consisting of hydrogen, lower alkyl and $R^3$ and $R^4$ taken together represent with the carbon to which they are attached a cyclohexene ring having a double bond in the 3-position which comprises heating at a temperature within the range from about room temperature to 200° C. tetracyanoethylene and a glycol selected from the class consisting of compounds of the formula

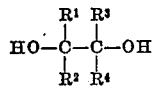

wherein the R's are selected from the class consisting of hydrogen and lower alkyl, and compounds of the formula $$HO-\underset{\underset{R^2}{|}}{\overset{\overset{R^1}{|}}{C}}-\underset{\underset{R^4}{|}}{\overset{\overset{R^3}{|}}{C}}-\underset{\underset{R^6}{|}}{\overset{\overset{R^5}{|}}{C}}-OH$$

wherein the R's are selected from the class consisting of hydrogen, lower alkyl, and $R^3$ and $R^4$ taken together with the carbon to which they are attached represent a cyclohexene ring having a double bond in the 3-position.

(References on following page)

References Cited in the file of this patent

UNITED STATES PATENTS

| | | |
|---|---|---|
| 2,683,659 | Schlesinger | July 13, 1954 |
| 2,883,368 | Middleton | Apr. 21, 1959 |

FOREIGN PATENTS

| | | |
|---|---|---|
| 544,421 | Great Britain | Apr. 13, 1942 |
| 888,968 | France | Dec. 28, 1943 |

UNITED STATES PATENT OFFICE
Certificate of Correction

Patent No. 2,980,698                                                            April 18, 1961

Richard Edwin Heckert et al.

It is hereby certified that error appears in the above numbered patent requiring correction and that the said Letters Patent should read as corrected below.

Column 3, lines 4 and 5, for "2-dicycanomethylene" read —2-dicyanomethylene—; column 3, line 51, for "alcoohls" read —alcohols—; column 5, lines 71 to 74, the formula should appear as shown below instead of as in the patent:

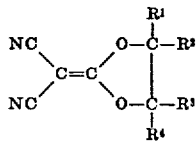

column 6, lines 3 to 6, the formula should appear as shown below instead of as in the patent:

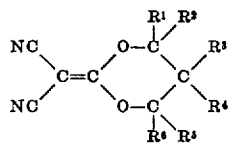

lines 14 to 19, the formula should appear as shown below instead of as in the patent:

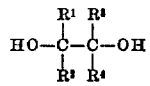

same column 6, lines 22 to 28, the formula should appear as shown below instead of as in the patent:

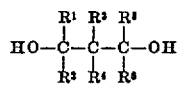

Signed and sealed this 9th day of January 1962.

[SEAL]

Attest:
ERNEST W. SWIDER,                                                DAVID L. LADD,
*Attesting Officer.*                                                  *Commissioner of Patents.*